(12) United States Patent
Moskwa (10) Patent No.: US 6,212,945 B1
(45) Date of Patent: Apr. 10, 2001

(54) METHOD AND APPARATUS FOR COMBUSTION QUALITY DIAGNOSIS AND CONTROL UTILIZING SYNTHETIC MEASURES OF COMBUSTION QUALITY

(75) Inventor: John J. Moskwa, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 08/986,258

(22) Filed: Dec. 5, 1997

(51) Int. Cl.⁷ .................................................. G01M 15/00
(52) U.S. Cl. .......................................... 73/117.3; 701/111
(58) Field of Search ................................... 73/116, 117.2, 73/117.3; 340/439; 701/99, 101, 102, 111

(56) References Cited

PUBLICATIONS

Shiao, Yoajung; Pan, Chung–hung; Moskwa, John J., Advanced dynamic spark ignition engine modeling for diagnostics and control, American Society of Mechanical Engineers, Dynamic Systems and Control Division (publication) DSC Advanced Automotive Technologies Proceedings of the 1993 ASME Winter Annual Meeting Nov. 28–Dec. 3, 1993, New Orleans, LA, vol. 52, pp. 211–219.

Rizzoni, Giorgio; Lee, Donghyeon; Ribbens, William B., Detection of partial misfire in ic engines using a measurement of crankshaft angular velocity, American Society of Mechanical Engineers, Dynamic Systems and Control Division (Publication) DSC Transpotation Systems Proceedings of the 1994 International Mechanical Engineering Congress and Exposition Nov. 6–11, 1994, Chicago, IL, vol. 54, pp. 205–230.

Jewitt, T.H.B., Lawton, B., Use of Speed Sensing For Monitoring The Condition of Military Vehicle Engines, Proceedings of the Institution of Mechanical Engineers, Part D: Transport Engineering 1986, vol. 200 n 1, pp. 45–51.

Pan, Chung–Hung; Moskwa, John J., Analysis of the effects of torque, engine geometry and speed on choosing an engine inertia model to minimize prediction errors, American Control Conference Proceedings of the 1993 American Control Conference Part 2 (of 3) Jun. 2–4, 1993, San Francisco, CA, pp. 1784–1789.

Connolly, Francis T.; Rizzoni, Giorgio, Real time estimation of engine torque for the detection of engine misfires, Journal of Dynamic Systems, Measurement and Control, Transactions of the ASME Dec. 4, 1994, New York, NY, vol. 116 n, pp. 675–686.

Moskwa, John J., Pan, Chung–hung, Engine load torque estimation using nonlinear observers, Proceedings of the IEEE Conference on Decision and Control Proceedings of the 1995 34th IEEE Conference on Decision and Control, Part 4 (of 4) Dec. 13–15, 1995, New Orleans, LA vol. 4, pp. 3397–3402.

*Primary Examiner*—Eric S. McCall
(74) *Attorney, Agent, or Firm*—Craig A. Fieschko, Esq.; DeWitt Ross & Stevens S.C.

(57) ABSTRACT

Disclosed is a method and apparatus for generating a synthetic measure of combustion quality which is particularly useful in diagnosing and controlling combustion quality in internal combustion engines. The synthetic measures, which may be generated utilizing an engine's actual speed or acceleration as an input, have the important qualities that they (1) accurately reflect the engine's actual combustion work at all nominal engine speeds, and (2) retain essentially the same characteristics (e.g., waveform shape) at all nominal engine speeds. These qualities significantly simplify combustion diagnosis and control. The synthetic measures for the overall engine may be resolved into the contributions from each individual cylinder in the engine if diagnosis and control of combustion quality in the individual cylinders is desired.

21 Claims, 6 Drawing Sheets

METHOD AND APPARATUS FOR COMBUSTION QUALITY DIAGNOSIS AND CONTROL UTILIZING SYNTHETIC MEASURES OF COMBUSTION QUALITY

FIELD OF THE INVENTION

This disclosure concerns an invention relating generally to methods and apparata for diagnosing and controlling combustion quality in internal combustion engines, and more specifically to robust methods and apparata for diagnosing and controlling combustion quality over a wide range of nominal engine speeds.

BACKGROUND OF THE INVENTION

As a response to stringent emission requirements being set for internal combustion engines, engineers are developing apparata and methods to help reduce vehicle tailpipe emissions. These have included such apparata and methods as closed-loop feedback control on air/fuel ratio in order to take advantage of catalyst characteristics, and various forms of port and throttle body fuel injection. In modern research engines other apparata and methods are being investigated in order to reduce unwanted emissions to an even lower level. Many of these new apparata and methods seek new ways of controlling combustion quality, which has a direct influence on engine emissions. However, in order to influence combustion quality with the result of obtaining desired tailpipe emissions, some effective and robust means for diagnosing combustion quality is needed. With such means, engineers can better investigate the effects of varying the engine control parameters on combustion quality and develop an effective control strategy, and/or implement such means in the engine's diagnostics/controls systems.

One method of assessing combustion quality is to monitor engine speed and/or acceleration in the time domain. Aberrational changes in speed and acceleration can indicate the presence of engine misfires. If aberrations are detected, engine diagnostics/controls systems can respond by influencing engine behavior to reduce or prevent further misfire. However, as will be discussed below, there are practical problems with properly diagnosing misfires in time-domain speed/acceleration data. Before discussing these problems in detail, it is first valuable to review the dynamic behavior of engines.

The two most common engine dynamics models are the constant inertia model and the time-varying inertia model, each of which are well-known expressions of Newton's 2nd law. The constant inertia model can be expressed as follows:

$$\bar{J} \cdot \ddot{\theta} = \sum_{i=1}^{n} P_i \cdot \frac{\partial V_i}{\partial \theta} + \sum T_{friction/pumping} + \sum T_{external} \qquad (1)$$

where $\bar{J}$ represents an estimated constant polar moment of inertia of the engine about the crankshaft axis (generally the average value of $J(\theta)$, though other values can be used);

$\theta$ is the crankshaft rotation angle;

P is the cylinder pressure;

V is the cylinder volume; and n is the number of cylinders.

The final two summations in equation (1) represent friction and pumping torques as well as all other external torques applied to the crankshaft.

The time-varying inertia model may be expressed as follows:

$$J(\theta) \cdot \ddot{\theta} + \frac{1}{2} \cdot \frac{\partial J(\theta)}{\partial \theta} \cdot \dot{\theta}^2 = \sum_{i=1}^{n} P_i \cdot \frac{\partial V_i}{\partial \theta} + \sum T_{friction/pumping} + \sum T_{external} \qquad (2)$$

where $J(\theta)$ represents the actual crankangle-varying polar moment of inertia of the piston and its slider-crank mechanism (the connecting rod and crankshaft, though any other rotational inertias can be included as well);

$\theta$ is the crankshaft rotation angle;

P is the cylinder pressure;

V is the cylinder volume; and n is the number of cylinders.

Friction, pumping, and external torques are also taken into account in equation (2).

These models can be used to calculate estimated speed and acceleration data in a real engine. In the real engine, pressure may be measured using quartz piezoelectric transducers or other pressure sensors, and $\bar{J}$, $J(\theta)$, and V may all be calculated if the engine geometry is known. These values may then be used in equations (1) and (2) to solve for speed $\dot{\theta}$ and acceleration $\ddot{\theta}$. Plots of calculated speed and acceleration over time for an exemplary four-cylinder, four-stroke internal combustion engine operating at low nominal speed (around 2100 RPM) are shown for both models in FIGS. 1 and 2. (Note that the friction, pumping, and external torques from equations (1) and (2) were assumed to be constant, though they need not be constant to implement equations (1) and (2) and are expected not to be constant in a vehicle.)

Figure 1:
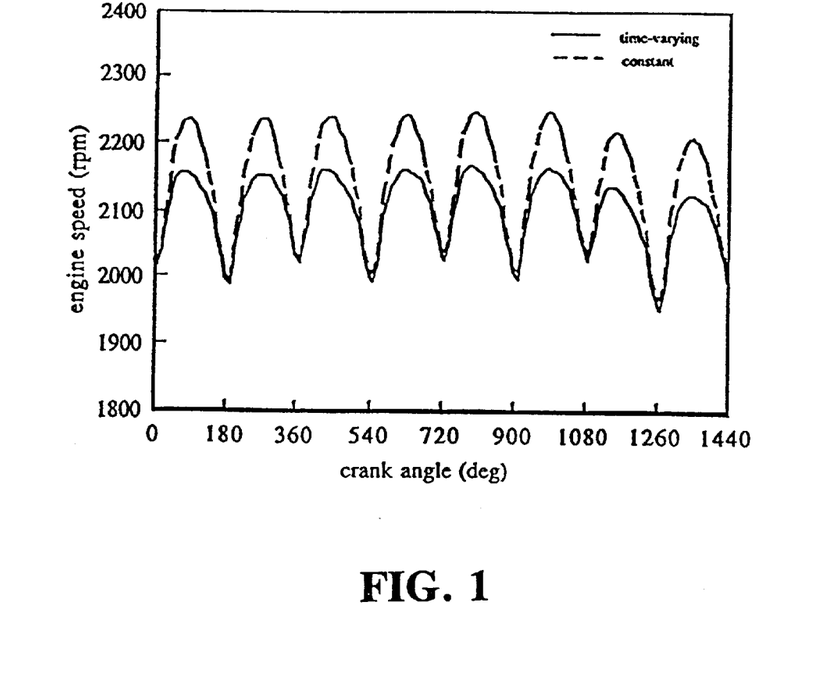
FIG. 1 is a plot of predicted engine speed versus engine crank angle at low nominal engine speed, the predicted engine speed being calculated by the constant inertia engine dynamics model and the time-varying inertia engine dynamics model.
Figure 2:
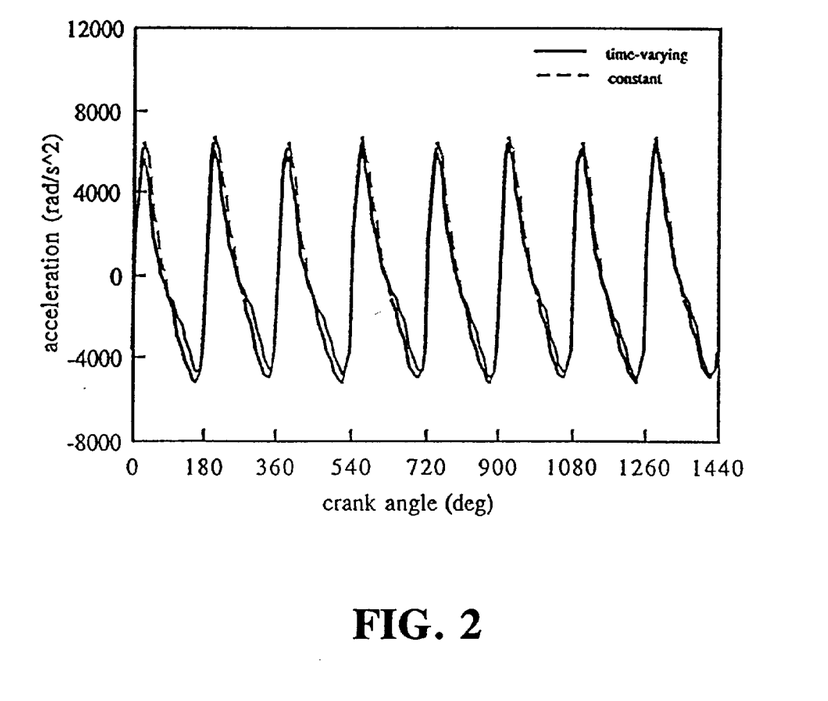
FIG. 2 is a plot of predicted engine acceleration versus engine crank angle at low nominal engine speed, the predicted engine acceleration being calculated by the constant inertia engine dynamics model and the time-varying inertia engine dynamics model.

FIG. 1 illustrates the roughly sinusoidal variation in calculated engine speed about the nominal (average) engine speed as the crankshaft turns. FIG. 2 similarly illustrates engine acceleration, which generates a roughly sawtooth trace varying about zero. As the engine approaches top dead center of the compression stroke for one of the four cylinders at $\theta = n \cdot 180°$ (n is an integer), the crankshaft slows down because it has to do work on the gas during compression (i.e., the kinetic energy of the crankshaft is converted into potential energy in the cylinder gas). After top dead center, the engine accelerates because the power stroke (expansion/work stroke) has begun and combustion gases are working on the crankshaft.

Except for a small offset in speed, the speed and acceleration waveforms from the two models are quite similar. This is to be expected because equation (2) approximates equation (1) at low engine speeds, the difference between the results of the models largely being due to the inertia of equation (2) varying with crankshaft angle. These inertial effects are nearly linear at low speed. In comparison to actual experimental data (not shown), the calculated speed and acceleration shown on the plots of FIGS. 1 and 2 are quite close to experimental data with the exception that the constant inertia model predicts a high (and inaccurate) speed in comparison to the time-varying inertia model. This makes the constant inertia model generally unsuitable for use in calculating speed for application in feedback control. The time-varying inertia model can be considered as providing an accurate depiction of experimental data.

Figure 3:
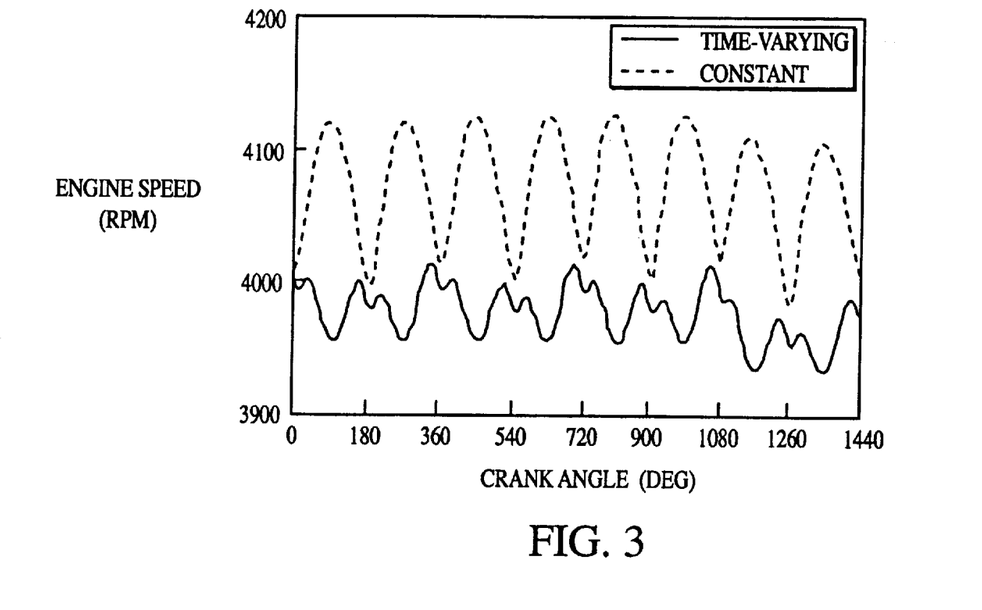
FIG. 3 is a plot of predicted engine speed versus engine crank angle at high nominal engine speed, the predicted engine speed being calculated by the constant inertia engine dynamics model and the time-varying inertia engine dynamics model.
Figure 4:
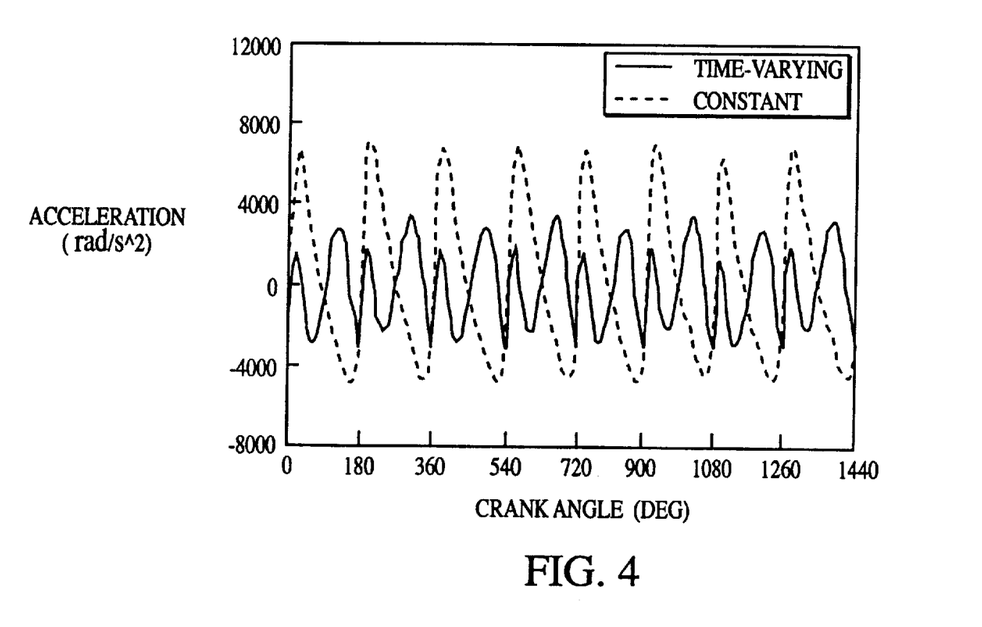
FIG. 4 is a plot of predicted engine acceleration versus engine crank angle at high nominal engine speed, the predicted engine acceleration being calculated by the constant inertia engine dynamics model and the time-varying inertia engine dynamics model.

FIGS. 3 and 4 then show the speed and acceleration calculated using the constant and time-varying inertia models using cylinder pressure profiles taken from the same engine at a higher nominal engine speed, approximately 4000 rpm. The magnitude and shape of the speed and acceleration plots for the constant inertia model (equation (1)) are not significantly changed from the results at 2100 rpm. This is to be expected from equation (1), which is not speed-dependent—it will produce similar-appearing waveforms regardless of the nominal engine speed. However, the plots of calculated speed and acceleration for the time-varying model (equation (2)) look drastically different from those at lower nominal engine speed. This is because in equation (2), rotational acceleration θ depends on both the crankshaft angle as well as its speed squared $\dot{\theta}^2$. Therefore, as the nominal engine speed is varied, the speed and acceleration plots for equation (2) will change significantly in magnitude and shape. Looking to the plots for the time-varying inertia model, the dominant speed waveform appears to be out of phase with that of the calculated speed for the constant inertia model, and the engine appears to speed up during part of the compression stroke. This is because the speed-squared term becomes very large in the time-varying inertia model (and in an actual engine), and the rate of inertia change decreases as the engine approaches top dead center at θ=n ·180°. The acceleration profile for the time-varying inertia model looks almost like a sinusoid with a sharp positive peak following top dead center. The sinusoidal waveform comes from the $\delta J(\theta)/\delta\theta$ term, with the positive peaks resulting from superimposed combustion energy accelerating the crankshaft. In comparison to experimental data, the results of the time-varying inertia model are still generally accurate, but the results of the constant inertia model are grossly inaccurate.

When designing engine diagnostics/control systems, a speed or acceleration trace such as that produced by the constant inertia model is desirable because it has fairly uniform shape and magnitude at all nominal engine speeds. It would thus be fairly easy to detect aberrations such as those caused by misfire, as by using analog and/or digital control elements to detect abnormal rates of velocity/acceleration change, or by otherwise detecting telltale signs of misfiring. Unfortunately, as noted above the constant inertia model is more valuable as a theoretical tool than a practical one: its results grow inaccurate as nominal engine speed increases, and thus it cannot serve as a good indicator of combustion quality for control purposes. As for the time-varying inertia model, it can accurately indicate combustion quality across a wide range of nominal engine speeds, but the behavior variations in predicted speed and acceleration across this speed range makes it difficult to design a robust control system for qualitatively evaluating combustion quality. In other words, it is difficult to design a diagnostics/control system using the time-varying inertia model (i.e., the actual engine configuration) that can consistently distinguish misfires from standard engine behavior when the engine behavior changes from that depicted in FIGS. 1 and 2 to that of FIGS. 3 and 4.

SUMMARY OF THE INVENTION

The invention, which is defined by the claims set out at the end of this disclosure, is directed to robust methods and apparata for measuring combustion quality over a wide range of nominal engine speeds. The methods involve the use of actual instantaneous engine performance data such as actual speed, actual acceleration, etc. to produce a synthetic measure of combustion quality, such as a synthetic speed, synthetic acceleration, synthetic torque, synthetic pressure, etc. The synthetic measure of combustion quality may then be used by the engine diagnostics/controls systems to diagnose combustion quality and/or influence engine parameters to reduce misfire.

To briefly summarize the method by which the synthetic measures of combustion quality are obtained, the actual torques on an engine are estimated using the time-varying engine dynamics model of equation (2) above. These actual torques are then used in the constant inertia engine dynamics model of equation (1), which may then be solved for a synthetic speed, acceleration, torque (indicated or brake), mean effective pressure (indicated or brake), etc. This method has the overall effect of stripping out the inertial effects which affect high-speed engine dynamics, resulting in a synthetic measure of combustion quality which has several unique characteristics.

First, as the appellation "synthetic" implies, the synthetic measures do not correspond to actual engine data; in other words, the synthetic speed used by the invention does not correspond to actual engine speed, the synthetic acceleration does not correspond to actual acceleration, and so on. The synthetic measures amount to a transformation of physical engine quantities into new quantities which reflect engine characteristics in an entirely new way.

Second, the synthetic measures have the important property that they are independent of nominal engine speed, like the constant inertia engine dynamics model but unlike the time-varying inertia model. Under normal operating conditions, the synthetic measures produce waveforms having the same shapes at any nominal engine speeds, and thus the aberrations caused by misfires are easier to discern by diagnostics/controls systems.

Third, the synthetic measures provide an accurate and reliable measure of combustion quality at all nominal engine speeds, like the time-varying inertia model but unlike the constant inertia model.

The synthetic measures are calculated by measuring the instantaneous engine speed by use of an appropriate speed sensor and utilizing the engine speed in the aforementioned method, wherein $\bar{J}$, $J(\theta)$, $\delta J(\theta)/\delta\theta$ are all known or easily calculated if the engine geometry is known. The integration, differentiation, and/or other mathematical steps of the method are preferably performed by the use of a firmware processor such as an ASIC (application specific integrated circuit) utilizing standard numeric methods. An ASIC or other processor in firmware form is preferred because it can easily perform the necessary calculations to obtain results in real time, whereas software processing is not currently fast enough to allow real-time use of higher-order numeric methods, which provide greater accuracy.

The synthetic measures may then be used as control signals, e.g., as feedback, in an engine control system to modify engine parameters in response to engine misfire. In order to better control the parameters within each individual cylinder of the engine, the synthetic measures may be resolved by use of known numeric methods into the separate contributions made by each cylinder (e.g., by use of the autocorrelation function). These contributions can then be used as control signals for their respective cylinders. The accuracy of this resolving process may be enhanced by providing each cylinder with a sensor which detects indicia relating to the combustion quality within that cylinder, and which provides a corresponding output signal. These output signals can then help to correctly correlate each cylinder with its contribution to the synthetic measure of combustion quality. The use of such additional sensors is particularly recommended where there is significant combustion stroke overlap between cylinders. The sensors can help to more accurately discern the contributions made by overlapping cylinders, which would otherwise appear to behave identically if the additional information provided by the sensors was not available.

Further advantages, features, and objects of the invention will be apparent from the following detailed description of the invention in conjunction with the associated drawings.

DETAILED DESCRIPTION OF PREFERRED EMBODIMENTS OF THE INVENTION

The invention is best understood by first reviewing the method by which the synthetic measure of combustion quality is generated. The sum of all of the torques applied to the actual engine inertia is estimated by using the time-varying inertia model, equation (2) above, by supplying actual engine speed/acceleration data to the left-hand side of equation (2). The estimated torques are then used in the constant inertia model, equation (1) above, by inserting them in the right-hand side of equation (2). Equation (2) can then be solved for speed (or acceleration) to provide a synthetic speed (or acceleration) that is independent of nominal speed. Since synthetic speed and/or acceleration are calculated by estimating the total torque using the time-varying inertia model and then sending the total torque to the constant inertia model, the mathematical analog is to simply set the right-hand side of equations (1) and (2) equal to each other, or:

$$J(\theta) \cdot \ddot{\theta} + \frac{1}{2} \cdot \frac{\partial J(\theta)}{\partial \theta} \cdot \dot{\theta}^2 = \bar{J} \cdot \ddot{\theta}_{syn} \qquad (3)$$

Here, $\ddot{\theta}_{syn}$ represents the synthetic acceleration, with the other variables having been explained above with respect to equations (1) and (2) (the P$\delta$V/$\delta\theta$ and torque summations not being shown since they may be cancelled from each side of equation (3)). The synthetic acceleration $\ddot{\theta}_{syn}$ can easily be calculated by dividing both sides of equation (3) by $\bar{J}$. The synthetic speed $\dot{\theta}_{syn}$ can then be found by integrating to obtain $$\dot{\theta}_{syn} = \frac{J(\theta)}{\bar{J}} \cdot \dot{\theta} - \frac{1}{2 \cdot \bar{J}} \cdot \int \frac{\partial J(\theta)}{\partial \theta} \cdot \dot{\theta}^2 \cdot dt \qquad (4)$$

The synthetic speed and acceleration profiles are not the same as the actual engine speed and acceleration profiles. Nevertheless, they have two important properties which make them useful for analyzing combustion quality. First, they are independent of nominal engine speed, that is, the shape of the synthetic speed/acceleration waveform does not change character with nominal engine speed. Second, the effect of combustion work (i.e., the combustion quality) is clearly observable regardless of the nominal engine speed. In effect, the inertial contributions that affect high speed dynamics have been stripped off of the speed and acceleration profiles. This considerably simplifies the ability of diagnostics/controls systems to detect aberrational speed and/or acceleration changes and thereby discern misfire events.

Figure 5:
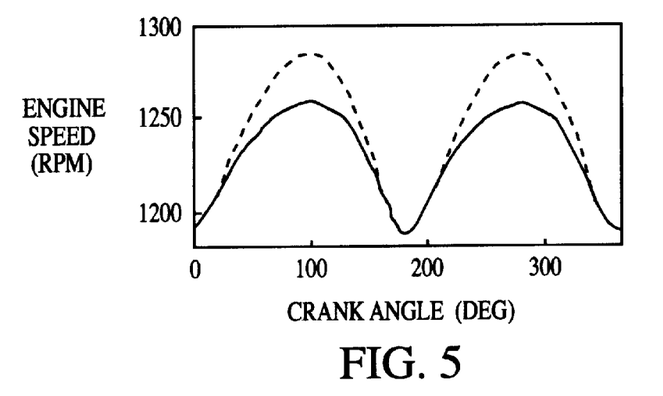
FIG. 5 is a plot of actual engine speed (solid line) and synthetic engine speed (dashed line) versus engine crank angle at low speed for a two-cylinder engine with both cylinders firing.
Figure 6:
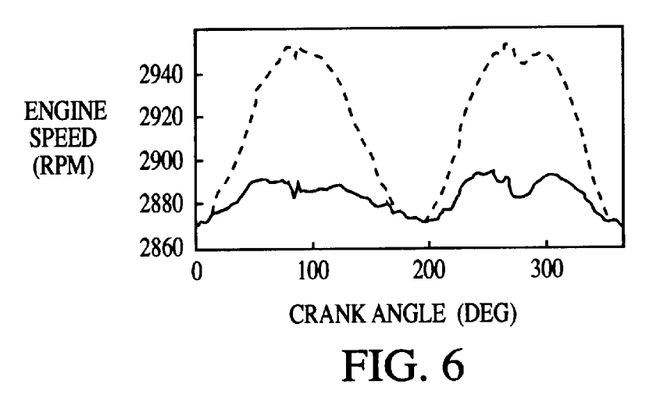
FIG. 6 is a plot of actual engine speed (solid line) and synthetic engine speed (dashed line) versus engine crank angle at high speed for a two-cylinder engine with both cylinders firing.
Figure 7:
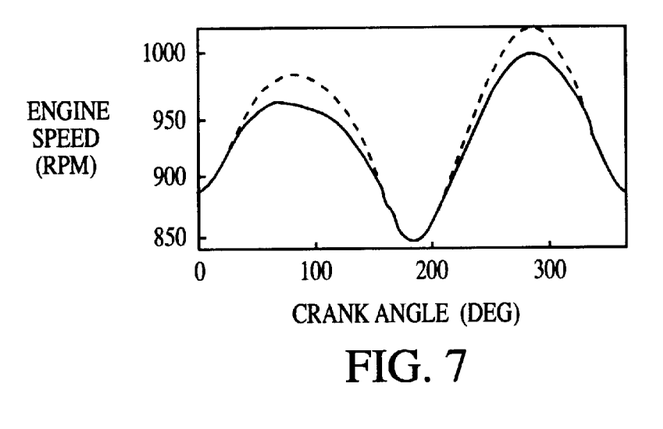
FIG. 7 is a plot of actual engine speed (solid line) and synthetic engine speed (dashed line) versus engine crank angle at low speed for a two-cylinder engine with cylinder 1 firing.
Figure 8:
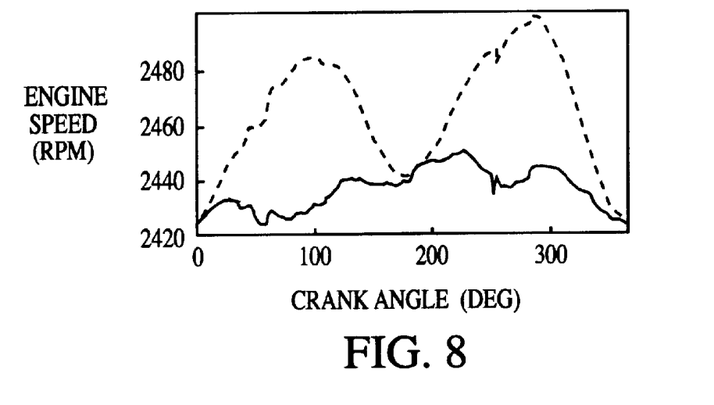
FIG. 8 is a plot of actual engine speed (solid line) and synthetic engine speed (dashed line) versus engine crank angle at high speed for a two-cylinder engine with cylinder 1 firing.
Figure 9:
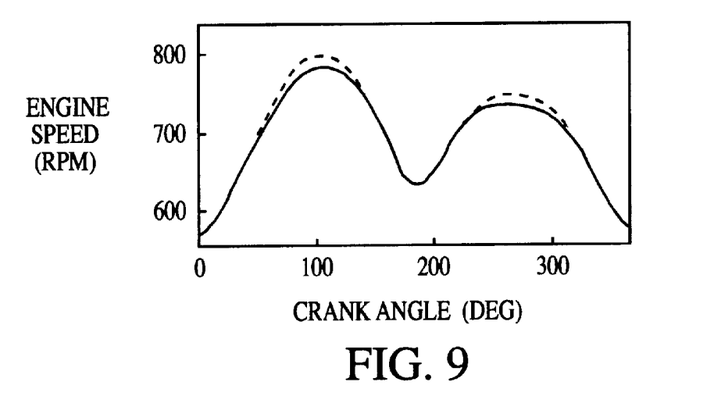
FIG. 9 is a plot of actual engine speed (solid line) and synthetic engine speed (dashed line) versus engine crank angle at low speed for a two-cylinder engine with cylinder 2 firing.
Figure 10:
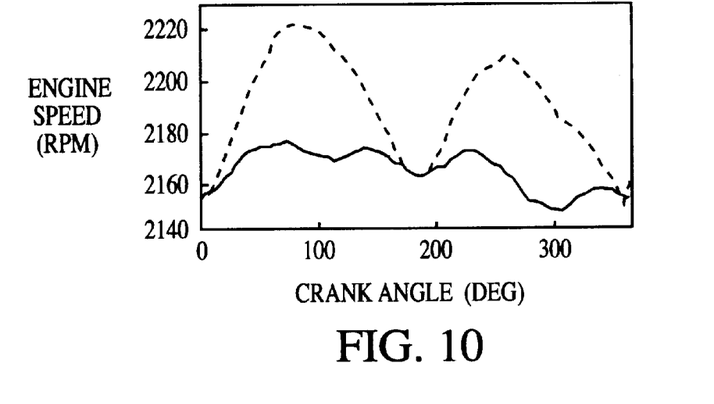
FIG. 10 is a plot of actual engine speed (solid line) and synthetic engine speed (dashed line) versus engine crank angle at high speed for a two-cylinder engine with cylinder 2 firing.
Figure 11:
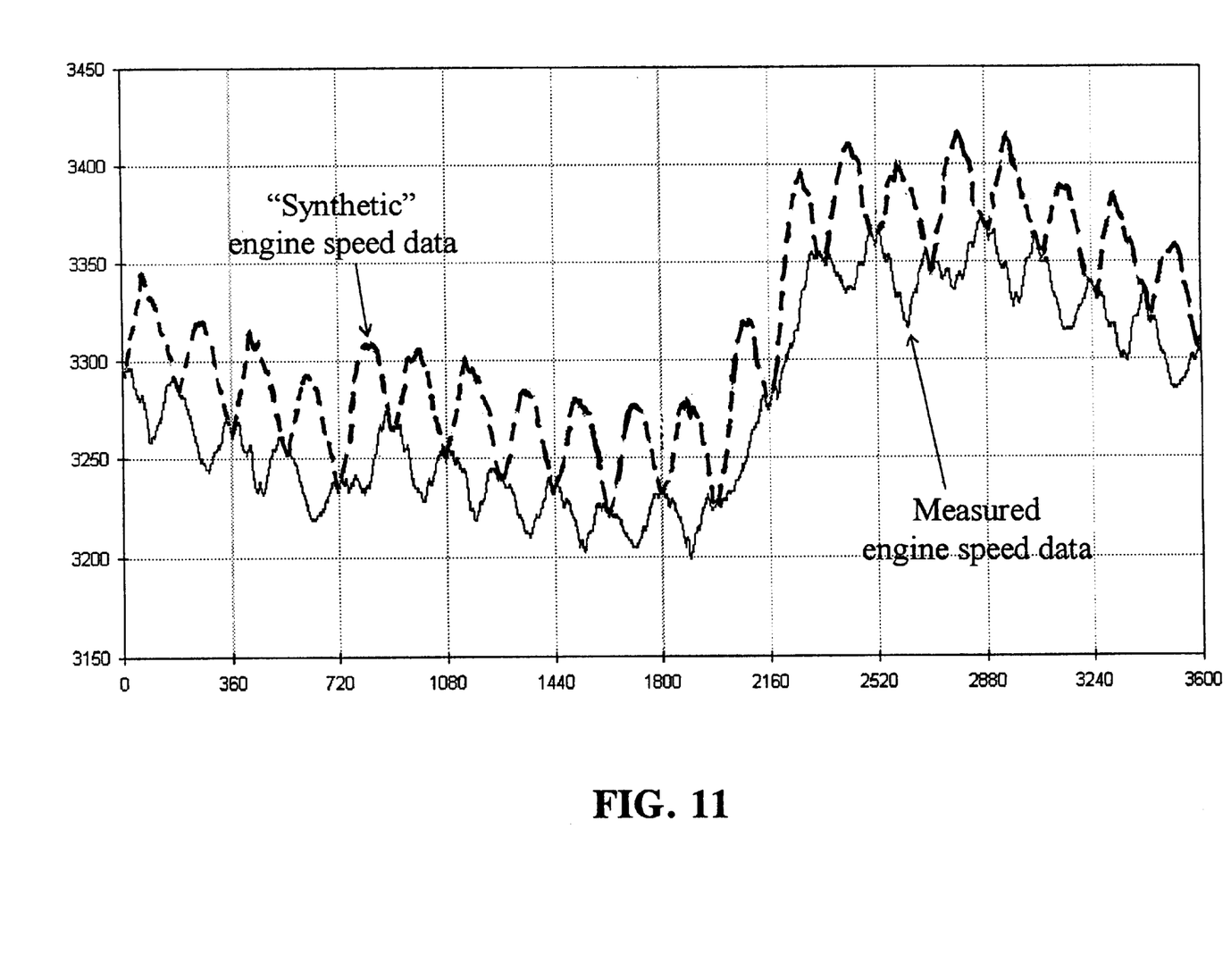
FIG. 11 is a plot of actual engine speed (solid line) and synthetic engine speed (dashed line) versus engine crank angle at high speed for a two-cylinder engine with both cylinders firing.

To illustrate, plots of synthetic speed versus crank angle for a two-cylinder engine are illustrated in FIGS. 5–10 in dashed lines with actual speed shown in solid lines for comparison. FIGS. 5 and 6 were obtained with both cylinders firing, whereas FIGS. 7 and 8 were obtained with a single cylinder firing and FIGS. 9 and 10 with the other cylinder firing. FIGS. 5, 7, and 9 were obtained at low speeds and FIGS. 6, 8, and 10 were obtained at high speed and clearly show inertial effects in the actual engine speed traces. FIG. 11 then illustrates synthetic speed versus crank angle at high speed with both cylinders firing, and wherein the nominal engine speed is being varied between approximately 3225–3350 rpm over a number of cycles. It would clearly be difficult to ascertain misfire or other indicia of combustion quality from the actual engine speed traces at high speed owing to their irregularity, particularly where the nominal engine speed is changing (see particularly FIG. 11). The high-speed synthetic speed traces illustrate the value of synthetic speed in that inertial effects are stripped off, providing a speed trace from which combustion quality can be more readily assessed regardless of engine speed. Misfires or other aberrations will cause aberrations in the synthetic traces that are more readily detected and corrected by derivative or other controls.

The synthetic speed and/or acceleration can be calculated in real-time on high-speed engine diagnostic/control electronics through the use of an appropriate processor, e.g., an application specific integrated circuit (ASIC). $\bar{J}$, $J(\theta)$, and $\delta J(\theta)/\delta\theta$ may be calculated from engine geometry, and thus synthetic speed and/or acceleration may be found by measuring the engine speed (instantaneous, rather than nominal) and solving equations (3) and/or (4) at each time step. Any suitable numeric integration methods may be used, though some numeric methods may be superior to others if a particular level of calculation speed and/or accuracy is desired. Higher-order numeric methods may lead to more accurate results but will require greater computational time, and at some point the results may not be sufficiently "real-time" to justify use of a particular numeric method. It is believed to be a matter of routine optimization for a skilled artisan to choose an appropriate numeric method depending on the needs of the application at hand.

After the synthetic speed and acceleration are calculated, they can be utilized in engine control and diagnostic systems to detect the presence of misfire and actuate changes in the spark, air/fuel ratio, etc. to reduce or eliminate misfiring. In addition, the synthetic speed and acceleration can themselves be used to calculate other valuable control quantities by simply utilizing the synthetic speed and acceleration in place of actual speed and acceleration in known engine modeling equations. As examples the synthetic acceleration can be used in the left-hand side of equation (1) to provide an synthetic total torque exerted on the crankshaft. With an estimate of external torque., the synthetic acceleration can be used in equation (1) to provide a synthetic engine output torque. With estimates of external and friction/pumping torques, the synthetic acceleration can be used in equation (1) to provide a synthetic instantaneous indicated torque (indicated work) which, as discussed below, represents the synthetic indicated work for each individual cylinder for engines that do not have significant torque overlap. Each cylinder's synthetic instantaneous indicated torque can be time-averaged and divided by the cylinder's displacement volume to calculate that cylinder's synthetic indicated mean effective pressure (IMEP, the theoretical constant pressure that can be imagined as being exerted during each power stroke to produce work equal to the average indicated work). In this manner, the synthetic speed and/or acceleration can be used to calculate a wide variety of further synthetic quantities useful for engine diagnostic and control purposes.

Equation (2) can also be expanded to include compliant members (i.e., members having elastic characteristics) that transmit engine torque in the powertrain. Consider, for example, the powertrain illustrated in FIG. 12, wherein engine 10 is connected to driveline component 12 by compliant member 14 having spring constant k. With additional speed measurement on either side of the compliant member 14, the load torque on the engine crankshaft can also be determined. This concept is illustrated by the following simple example, it being understood that this concept can be expanded to accommodate whatever configuration is present in the powertrain system of interest.

Figure 12:
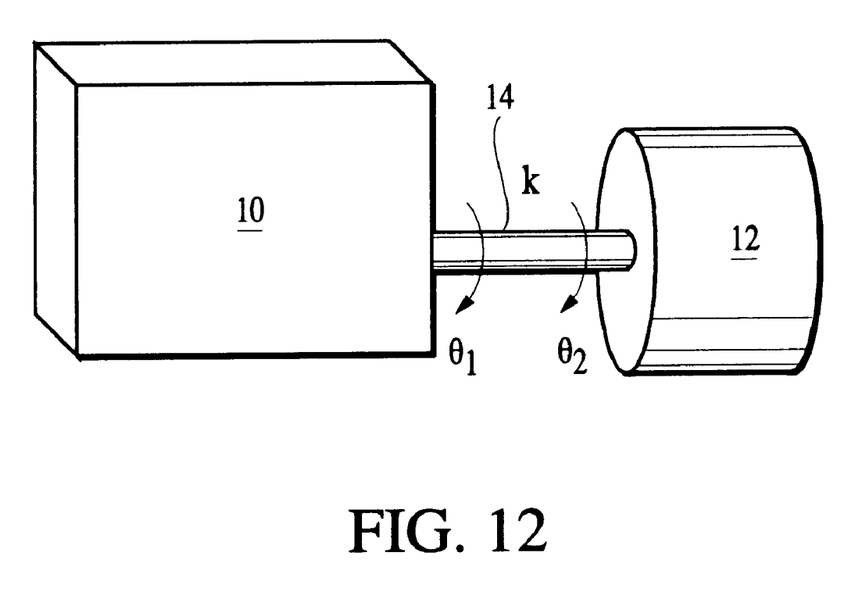
FIG. 12 is a schematic view of an engine connected to a powertrain component by a compliant shaft.

Because actual engine inertia is being considered, the governing equation for the rotational elements of engine 10 would be similar to equation (2), or $$J(\theta_1) \cdot \ddot{\theta}_1 + \frac{1}{2} \cdot \frac{\partial J(\theta_1)}{\partial \theta_1} \cdot \dot{\theta}_1^2 = \quad (5)$$

-continued
$$\sum_{i=1}^{n} P_i \cdot \frac{\partial V_i}{\partial \theta_1} + \sum T_{friction/pumping} + \sum T_{shaft}$$

In this equation, the external torque on the engine 10 is now the shaft torque $T_{shaft}$. Because the driveline component 12 has constant inertia, the governing equation for this component would be similar to equation (1), or $$J_2 \cdot \ddot{\theta}_2 = \Sigma T_{external} - T_{shaft} \quad (6)$$

The application of the external torque to the driveline component 12 must then be considered. Compliant member 14 connects the engine 10 and the driveline component 12, and the governing equation for this compliant member 14 would be:

$$T_{shaft} = k \cdot (\theta_2 - \theta_1) \quad (7)$$

If speed sensors are placed appropriately in the driveline to measure $\theta_1$ and $\theta_2$ (and the rotational velocities and accelerations of the driveline), then the shaft torque $T_{shaft}$ can be estimated from equation (7). The synthetic engine speed can be generated as previously outlined by use of equation (4) with the measured engine speed $\theta_1$, the shaft torque $T_{shaft}$, and an estimate of friction/pumping torque. Equation (4) can be expanded as follows:

$$\dot{\theta}_{syn1} = \frac{J(\theta_1)}{\bar{J}} \cdot \dot{\theta}_1 - \frac{1}{2 \cdot \bar{J}} \cdot \int \frac{\partial J(\theta_1)}{\partial \theta_1} \cdot \dot{\theta}_1^2 \cdot dt - \quad (8)$$
$$\frac{1}{\bar{J}} \cdot \int \left( \sum T_{friction/pumping} + \sum T_{shaft} \right) \cdot dt$$

In addition, the foregoing methods can be modified so that variations in the synthetic speed result only (or substantially) from variations in combustion quality. The synthetic speed trace that results from the methods previously discussed varies owing to variation in cylinder pressure, friction/pumping torque, and shaft torque. The cylinder pressure can be further decomposed into two components: the pressure resulting from the compression and expansion of intake gases without combustion, which will be referred to as the compression/expansion pressure, and the additional pressure from the combustion event itself, which will be referred to as the combustion pressure. The combustion pressure, being directly reflective of combustion quality, would be an extremely valuable quantity for use in engine diagnostics and control systems. This would be superior to the synthetic speed because even in the event of a complete misfire (e.g., no combustion), the synthetic speed trace would still appear somewhat sinusoidal because of the compression/expansion pressure.

While it would be quite difficult to precisely calculate the combustion pressure, it is possible to calculate an estimated combustion pressure, given that the geometry of the cylinder is well known, the crankshaft angle can be measured, and the compression/expansion pressure can be estimated given the measured or estimated initial cylinder pressure and temperature. It is known that compression and expansion events in typical internal combustion engines follow a polytropic process, or:

$$P_1 \cdot V_1^k = P_2 \cdot V_2^k = \text{constant} \quad (9)$$

where
  $P_1$ and $P_2$ represent the cylinder pressure at two chosen times ($P_1$ here being chosen to represent the initial cylinder pressure), $V_1$ and $V_2$ represent the cylinder volume at two chosen times ($V_1$ here being chosen to represent the initial cylinder volume), and k is the polytropic exponent, which is approximately constant for compression and expansion.

Because the cylinder geometry is known and the crankshaft angle can be accurately measured, the cylinder volume can be calculated during the period when compression and expansion occur. As noted above, the initial cylinder pressure $P_1$ can be measured or estimated. The "compression/expansion torque" that results from the compression/expansion pressure is then given by:

$$T_{compression/expansion} = P \cdot \frac{\partial V}{\partial \theta} = P_1 \cdot \left(\frac{V_1}{V_2}\right)^k \cdot \frac{\partial V}{\partial \theta} \quad (10)$$

The effect of the compression/expansion torque can then be removed from the synthetic speed. This is shown in the following equations where $\theta_{psyn}$ represents the new synthetic speed trace with the compression/expansion effects removed. Following equation (3):

$$\bar{J} \cdot \ddot{\theta}_{psyn} = \bar{J} \cdot \ddot{\theta}_{syn} - T_{compression/expansion} = \quad (11)$$

$$J(\theta) \cdot \ddot{\theta} + \frac{1}{2} \cdot \frac{\partial J(\theta)}{\partial \theta} \cdot \dot{\theta}^2 - T_{compression/expansion}$$

Using equation (10), this can be recast as $$\ddot{\theta}_{psyn} = \frac{J(\theta)}{\bar{J}} \cdot \ddot{\theta} + \frac{1}{2 \cdot \bar{J}} \cdot \frac{\partial J(\theta)}{\partial \theta} \cdot \dot{\theta}^2 - \frac{P_1}{\bar{J}} \cdot \left(\frac{V_1}{V_2}\right)^k \cdot \frac{\partial V}{\partial \theta} \quad (12)$$

Integrating to find the synthetic speed:

$$\dot{\theta}_{psyn} = \frac{J(\theta)}{\bar{J}} \cdot \dot{\theta} - \frac{1}{2 \cdot \bar{J}} \cdot \int \frac{\partial J(\theta)}{\partial \theta} \cdot \dot{\theta}^2 \cdot dt - \frac{P_1 \cdot V_1^k}{\bar{J}} \cdot \int V^{-k} \cdot \frac{\partial V}{\partial \theta} \cdot dt \quad (13)$$

Although the term on the far right of this last equation appears complicated, all of the elements inside the integral sign are only a function of engine geometry and are known a priori. If the pressure at the start of the closed period is known or estimated, this term is completely defined by the measured crankshaft position, and can be calculated off-line and stored in memory (i.e., it does not need to be calculated in real-time within the algorithm).

In the same manner, the effects of friction/pumping torque and shaft torque can be resolved from the synthetic speed to result in synthetic speeds which are nearly pure measures of combustion quality. Shaft torque can be calculated as described above, and friction/pumping torque can be estimated or calculated via torque models known from the literature or models empirically derived for the engine in question. Calculation of shaft torque and friction/pumping torque could add to the computational burden to such an extent that real-time calculation of synthetic speed is difficult, but this problem will be alleviated as processor speeds increase, and the computational burden could further be decreased by calculating estimates ahead of time and recalling them from memory when appropriate.

It is notable that where the methods are applied to engines that do not have considerable combustion stroke overlap—that is, where combustion strokes do not overlap between cylinders, such as in the 4 cylinder, 4-stroke engine discussed above—the combustion quality in each cylinder can be readily determined from the synthetic signal because it is clear which cylinder is affecting acceleration. As an example, in FIGS. 1–4, four cycles of the illustrated waveform(s) represents a complete combustion cycle for each of the cylinders (intake, compression, power, and exhaust strokes) with the piston for one of the cylinders accelerating away from top dead center at $\theta = n \cdot 180°$. Since the engine geometry is known, each piston's position at angle $\theta$ is known, and thus each cylinder's contribution to speed/acceleration can be discerned from the waveform(s). In similar fashion, each cylinder's contribution to the synthetic signal can be resolved and used to control the combustion quality in that individual cylinder.

However, with engines having significant combustion stroke overlap between cylinders—an example being a 6 cylinder, 2-stroke engine where there are six combustion events overlapping on every revolution—it can be more difficult to sort out the contribution from each cylinder to the synthetic signal. One way to approach the problem of resolving the overall synthetic signal into each cylinder's contributions is to examine the autocorrelation of the combustion torque for each cylinder, or $$R(t_1, t_2) = E\left[P \cdot \frac{\partial V}{\partial \theta}(t_1), P \cdot \frac{\partial V}{\partial \theta}(t_2)\right] \quad (14)$$

At any point in time, the instantaneous combustion torque for any cylinder in the time domain is not independent of the neighboring torques for that cylinder, so neighboring time-domain data points can help identify individual cylinders' contributions to the total torque reflected in the synthetic signal. One way to investigate this issue is to assume that the combustion torque $P \delta V / \delta \theta$ is identical but unknown in each cylinder. For a given engine configuration, the autocorrelation of each cylinder's combustion torque may be determined. The contribution of each cylinder to the total combustion torque being applied to the rotational inertia can then be estimated.

For a more realistic scenario where the combustion torque is considered to vary from cylinder to cylinder, an autocorrelation function can be identified for each cylinder for a range of combustion events (e.g., misfire, partial fire, good combustion). For example, if the cylinder pressure is exactly known at one crankangle location, then the change in cylinder pressure at 1 degree preceding or following this point can be statistically estimated. The statistically estimated difference in cylinder pressure as a function of the change in crankshaft angle (e.g., 1, 2, 3 or more degrees) can be represented by the autocorrelation function or equation (5). It is the expected amount a value should change in time. We can also represent this as a function of crankshaft angle degree because time and crankangle are related through engine speed. Combining this autocorrelation with the total combustion torque applied to the rotating inertia, or using the synthetic speed function defined above, a range for the possible combustion torque from each of the individual cylinders can be identified. The quality of combustion in each cylinder can then be determined from the estimated torques from the individual cylinders.

The use of an autocorrelation function to estimate the contribution of individual cylinders will not always lead to certain results. As the amount of overlap increases, as by increasing the number of cylinders or by moving from 4-stroke to 2-stroke engines, the certainty of the estimate decreases unless more information is provided to help resolve individual contributions. The use of information from additional sensors which detect indicia of combustion quality in each respective cylinder is a reasonable way of gaining a better estimate. As an example, placing pressure sensors in the cylinders' exhaust manifold ports can provide signals relating to combustion quality because a low pressure pulse can be an indicator of incomplete combustion. Combining these signals or others with the use of a synthetic signal and the minimal autocorrelation function for combustion torque can provide a robust estimate of individual cylinder combustion quality in the individual cylinders.

Calculation of the synthetic speed, acceleration, or other signal in an ASIC or other "firmware" processor is preferred at present because program-driven generation of a real-time synthetic signal does not appear feasible under current microprocessor speeds. However, it is expected that as microprocessor speeds increase, implementation in a program-driven processor will become a more attractive option. If real-time output is not necessary, program-driven processors are an inexpensive and readily available implementation option; for instance, a standard desktop PC running a numeric methods package such as MATHEMATICA (Wolfram Research, Champaign, Ill., USA) or MATLAB (Mathworks, Cambridge, Mass., USA) can perform the necessary calculations. Implementation of the method in either software or firmware form is believed to be well within the ordinary skill of an ordinary software or firmware designer.

An accuracy-related consideration is the fidelity of the speed sensor used to obtain the actual speed measurements from the engine. A sparse sensor (i.e., one with a low sampling rate) is generally less expensive, but too low of a sampling rate may not provide the accuracy needed to develop an effective synthetic signal. Along with selection of a suitable numeric calculation method, selection of a sensor with a suitable sampling rate to meet given speed, accuracy, size and cost constraints is also within the scope of ordinary skill in the art.

It is understood that preferred embodiments of the invention have been described above in order to illustrate how to make and use the invention. The invention is not intended to be limited to these embodiments, but rather is intended to be limited only by the claims set out below. Thus, the invention encompasses all alternate embodiments that fall literally or equivalently within the scope of these claims.

What is claimed is:

1. A method of determining a synthetic measure of combustion quality in an internal combustion engine having at least one cylinder, the method comprising:
   a. measuring engine speed,
   b. estimating engine torque using the measured engine speed in a variable-inertia engine dynamics model,
   c. calculating a synthetic measure of combustion quality using the estimated engine torque in a constant-inertia engine dynamics model.

2. The method of claim 1 further comprising the step of utilizing the synthetic measure of combustion quality as a control signal in an engine control system.

3. The method of claim 1 wherein the step of calculating a synthetic measure of combustion quality includes calculating at least one of synthetic engine speed and synthetic engine acceleration.

4. The method of claim 3 further comprising the step of calculating synthetic engine torque.

5. The method of claim 4 further comprising the step of calculating synthetic engine mean effective pressure.

6. The method of claim 1 further comprising the step of resolving the synthetic measure of combustion quality into several cylinder combustion quality contributions, each contribution representing the combustion quality of one cylinder within the engine.

7. The method of claim 6 further comprising the step of utilizing each cylinder's combustion quality contribution as a control signal when controlling the combustion within that cylinder.

8. The method of claim 6 further comprising the steps of:
   a. detecting, for each cylinder within the engine, signals related to the combustion quality within the cylinder; and
   b. correlating each cylinder's signal with that cylinder's combustion quality contribution.

9. The method of claim 1 further comprising the step of adjusting the estimated engine torque to exclude torque not arising from combustion.

10. An apparatus for generating a signal indicative of combustion quality in an engine having at least one cylinder, the apparatus comprising a processor configured to receive a speed signal input from the engine, the processor applying a variable-inertia engine dynamics model to the speed signal input to calculate an estimated engine torque and also applying a constant-inertia engine dynamics model to the estimated engine torque to thereby generate an output signal representing a synthetic measure of combustion quality.

11. The apparatus of claim 10 further comprising a speed sensor supplying the speed signal input to the processor.

12. The apparatus of claim 10 further comprising a controller connected to the processor and receiving the output signal as feedback.

13. The apparatus of claim 10 wherein the processor is an application specific integrated circuit.

14. The apparatus of claim 10 wherein the output signal represents synthetic speed.

15. The apparatus of claim 10 wherein the output signal represents synthetic acceleration.

16. The apparatus of claim 10 wherein the engine includes multiple cylinders, and wherein the processor generates multiple output signals, each output signal relating to one cylinder.

17. The apparatus of claim 16 wherein the processor is operatively connected to multiple sensors, each sensor being operatively connected to one cylinder to detect the combustion quality therein.

18. The method of claim 2 wherein the synthetic measure of combustion quality is calculated in accordance with $$\ddot{\theta}_{syn} = \frac{J(\theta)}{\bar{J}} \cdot \ddot{\theta} - \frac{1}{2 \cdot \bar{J}} \cdot \int \frac{\partial J(\theta)}{\partial \theta} \cdot \dot{\theta}^2 \cdot dt$$

where $\theta$ is a rotation angle of the engine crankshaft;

$J(\theta)$ is a crankangle-varying engine polar moment of inertia;

$\bar{J}$ is a constant engine polar moment of inertia;

$t$ is time; and $\dot{\theta}_{syn}$ is a synthetic engine speed.

19. The method of claim 18 wherein the synthetic measure of combustion quality is a synthetic acceleration $\ddot{\theta}_{syn}$.

20. The method of claim 18 wherein one synthetic measure of combustion quality is calculated for each cylinder in the engine.

21. The method of claim 12 wherein the synthetic measure of combustion quality is calculated in accordance with $$\dot{\theta}_{syn} = \frac{J(\theta)}{\bar{J}} \cdot \dot{\theta} - \frac{1}{2 \cdot \bar{J}} \cdot \int \frac{\partial J(\theta)}{\partial \theta} \cdot \dot{\theta}^2 \cdot dt$$

where
- $\theta$ is a rotation angle of the engine crankshaft;
- $J(\theta)$ is a crankangle-varying engine polar moment of inertia;
- $\bar{J}$ is a constant engine polar moment of inertia;
- t is time; and
- $\dot{\theta}_{syn}$ is a synthetic engine speed.

* * * * *